US007668839B2

(12) United States Patent
Otokawa et al.

(10) Patent No.: US 7,668,839 B2
(45) Date of Patent: Feb. 23, 2010

(54) APPLICATION MANAGEMENT FOR UTILIZING A REPLICATION ENGINE OF A WEB-AP SERVER TO EXECUTE SIP REPLICATION

(75) Inventors: Shinichi Otokawa, Kanagawa (JP); Haruo Fukuda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 215 days.

(21) Appl. No.: 11/452,271

(22) Filed: Jun. 14, 2006

(65) Prior Publication Data

US 2007/0011191 A1 Jan. 11, 2007

(30) Foreign Application Priority Data

Jun. 15, 2005 (JP) .............................. 2005-175188

(51) Int. Cl.
*G06F 17/30* (2006.01)
(52) U.S. Cl. ............................................ 707/10; 707/1
(58) Field of Classification Search .............. 707/104.1; 370/329, 338, 352
See application file for complete search history.

(56) References Cited

U.S. PATENT DOCUMENTS 6,438,114 B1 * 8/2002 Womack et al. ............. 370/329

6,937,563 B2 * 8/2005 Preston et al. .............. 370/230
7,120,141 B2 * 10/2006 Kikinis ....................... 370/352

OTHER PUBLICATIONS www.jcp.org/en/jsr/detail?id-116, The Java Community Process (SM) Program-JSRs: Java Specification Requests-Detail JSR#116, [Online], Java Commmunity Process, searched on May 6, 2005.
http://jakarta.apache.org/tomcat/tomcat-5-0-doc/cluster-howto.html, The Apache Jakarta Tomcat5 Servlet/JSR Container, [Online], The Apache Jakarta Project, searched on May 6, 2005.

* cited by examiner

*Primary Examiner*—Yicun Wu
(74) *Attorney, Agent, or Firm*—Venable LLP; Michael A. Sartori; Todd R. Farnsworth

(57) ABSTRACT

An application management system includes a first application manager which manages one or more first applications based on a first network protocol and manages first unit processing related to an execution of each of the first applications; a first unit processing replica generator that generates a replica of the first unit processing; a second application manager which manages one or more second applications based on a second network protocol and manages second unit processing related to an execution of each of the second applications; and a second unit processing replica manager that converts the second unit processing to the first unit processing and causes the first unit processing replica generator to generate a replica of the converted first unit processing for generating a replica of the second unit processing.

8 Claims, 13 Drawing Sheets

F1:

INVITE SIP. bob@biloxi.com SIP/2.0
Via: SIP/2.0/UDP pc33.atlanta.com; branch=z9hG4bK776asdhds
Max-Forwards: 70
TO: Bob(sip: bob@biloxi.com)
From: Alice(sip: alice@atlanta.com); tag=1928301774
Call-ID: a84b4c76e66710@pc33.atlanta.com
CSeq: 314159 INVITE
Contact: (sip: alice@pc33.atlanta.com)
Content-Type: application/sdp
Content-Length: 142

F4:

SIP/2.0 200 OK
Via: SIP/2.0/UDP server10.biloxi.com
    ; branch=z9hG4bKnashds8; received=192.0.2.3
To: Bob⟨sip: bob@biloxi.com⟩; tag=a6c85cf
From: Alice⟨sip: alice@atlanta.com⟩; tag=1928301774
Call-ID: a84b4c76e66710@pc33.atlanta.com
CSeq: 314159 INVITE
Contact:   ⟨sip: bob@192.0.2.4⟩
Content-Type: application/sdp
Content-Length: 131

APPLICATION MANAGEMENT FOR UTILIZING A REPLICATION ENGINE OF A WEB-AP SERVER TO EXECUTE SIP REPLICATION

BACKGROUND OF THE INVENTION

1. Field of the Invention

The present invention relates to a system and a method for managing application software, and also a server and a communications system therefor. More specifically, the present invention relates to a method for providing the replication function to a SIP-AP (Session Initiation Protocol-Application) server in a Web-VoIP (Web-Voice over Internet Protocol) cooperative AP environment where the Web-AP server environment providing AP (Application: application software) in the Web (World Wide Web) environment is cooperative with the VoIP server environment (SIP server environment) based on the SIP (Session Initiation Protocol), a typical protocol for implementing VoIP protocol.

2. Description of the Background Art

Recently, application-server-based systems are widely built to develop Web applications. For example, the application server technology in the Java (trade name) environment is defined by J2EE (Java 2 Platform, Enterprise Edition) with this tendency in mind. On the other hand, SIP (Session Initiation Protocol) based VoIP (Voice Over IP) is widely used as one of Internet services.

Although such applications are generally developed independently, a Web-AP/SIP-AP cooperative server is also available which simultaneously controls applications, each of which uses one of multiple network protocols, to provide high value-added, integrated applications.

FIG. 2 is a functional block diagram showing a typical functional configuration of a conventional Web-AP/SIP-AP cooperative server where a Web-AP server and a SIP-AP server are integrated. As shown in FIG. 2, a conventional Web-AP/SIP-AP cooperative server 2 has a configuration in which a Web-AP 3 and a SIP-AP 4 are included as Servlet containers 5 and 11 and in which the SIP based SIP-AP server function is cooperative with an existing Web-AP server.

The specifications disclosed on the website, www.jcp.org/en/jsr/detail?id=116, "The Java Community Process (SM) Program-JSRs: Java Specification Requests-Detail JSR#116, [Online], Java Community Process, searched on May 6, 2005, can be used as the specifications for the SIP Servlet, and the replication function of the SIP-Servlet is implemented based on the specifications of the SIP Servlet. Even when a host error occurs, the replication function of the SIP Servlet allows another host to continue the SIP session based on the replica of the SIP session.

The replication function of the Web-AP server is implemented in many methods. One of the typical methods is to establish the synchronization of HTTP session information among two or more Web-AP servers, i.e. to generate an HTTP session replica.

For example, another website, http://jakarta.apache.org/tomcat/tomcat-5.0-doc/cluster-ho wto.html, "The Apache Jakarta Tomcat5 Servlet/JSR Container, [Online], The Apache Jakarta Project, searched on May 6, 2005, discloses the replication function used in Tomcat.

As described above, a Web-AP/SIP-AP cooperative server is a server where a Web-AP server and a SIP-AP server are cooperative with each other.

However, one of the problems with such a Web-AP/SIP-AP cooperative server is that the replication function of the SIP-AP server is provided separately from the replication function provided by the Web-AP server. This means that two different replication server functions, each of which performs its own replication function, are present in the Web-VoIP cooperative AP environment, thus decreasing efficiency. In addition, because the replication functions are independent of each other, it is difficult for one of them to use and control the other.

Therefore, for use by a server that provides a cooperative application that associates applications with each other, each of which is based on one of different network protocols, there is a need for an system and a method for managing an application that can use the replication function of each server efficiently to implement efficient replication.

It is therefore an object of the present invention to provide a application management system and a method therefor which may efficiently use the replication function of servers providing a cooperative application which associates applications with each other to implement efficient replication.

SUMMARY OF THE INVENTION

In accordance with the present invention, an application management system for a server provides an application that associates a plurality of applications with each other, each of the applications being based on one of network protocols. The application management system comprises: a first application manager for managing one or more first applications, which are based on first one of the network protocols, and managing first unit processing related to an execution of each of the first applications; a first unit processing replica generator for generating a replica of the first unit processing when the first application manager generates the first unit processing; a second application manager for managing one or more second applications, which are based on second one of the network protocols, and managing second unit processing related to an execution of each of the second applications; and a second unit processing replica manager for converting the second unit processing of the second application to the first unit processing when the second application manager generates the second unit processing, and causing the first unit processing replica generator to generate a replica of the converted first unit processing for generating a replica of the second unit processing.

Also in accordance with the invention, an application management method for a server providing an application that associates a plurality of applications each other, each application being based on one of network protocols, comprises a first application management step of managing one or more first applications, which are based on first one of the network protocols, and managing first unit processing related to an execution of each of the first applications; a first unit processing replica generation step of generating a replica of the first unit processing when the first application management step generates the first unit processing; a second application management step of managing one or more second applications, which are based on a second network protocol, and managing second unit processing related to an execution of each of the second applications; and a second unit processing replica management step of converting the second unit processing of the second application to the first unit processing when the second application management step generates the second unit processing, and causing the first unit processing replica generation step to generate a replica of the converted first unit processing for generating a replica of the second unit processing.

Further in accordance with the invention, a server provides an application that associates a plurality of applications with each other, each of the applications being based on one of network protocols, wherein the server comprises the application management system described above.

Still further in accordance with the invention, the server described above may be included in a communication system, wherein, when one of the servers generates unit processing related to an application to be executed, a replica of the unit processing is generated to enable other of the plurality of servers to use the replica.

In accordance with the present invention, a server providing an application that associates a plurality of applications with each other, each of which is based on one of network protocols, can fully utilize the replication function of each server for efficient replication.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

With reference to the drawings, a preferred embodiment of a server of the present invention will be described in detail. In this embodiment, a server according to the present invention is applied to a cooperative server where a SIP-based SIP application server function is in cooperative with, or integrated into, a Web application server environment such as Tomcat and WebLogic.

Figure 3:
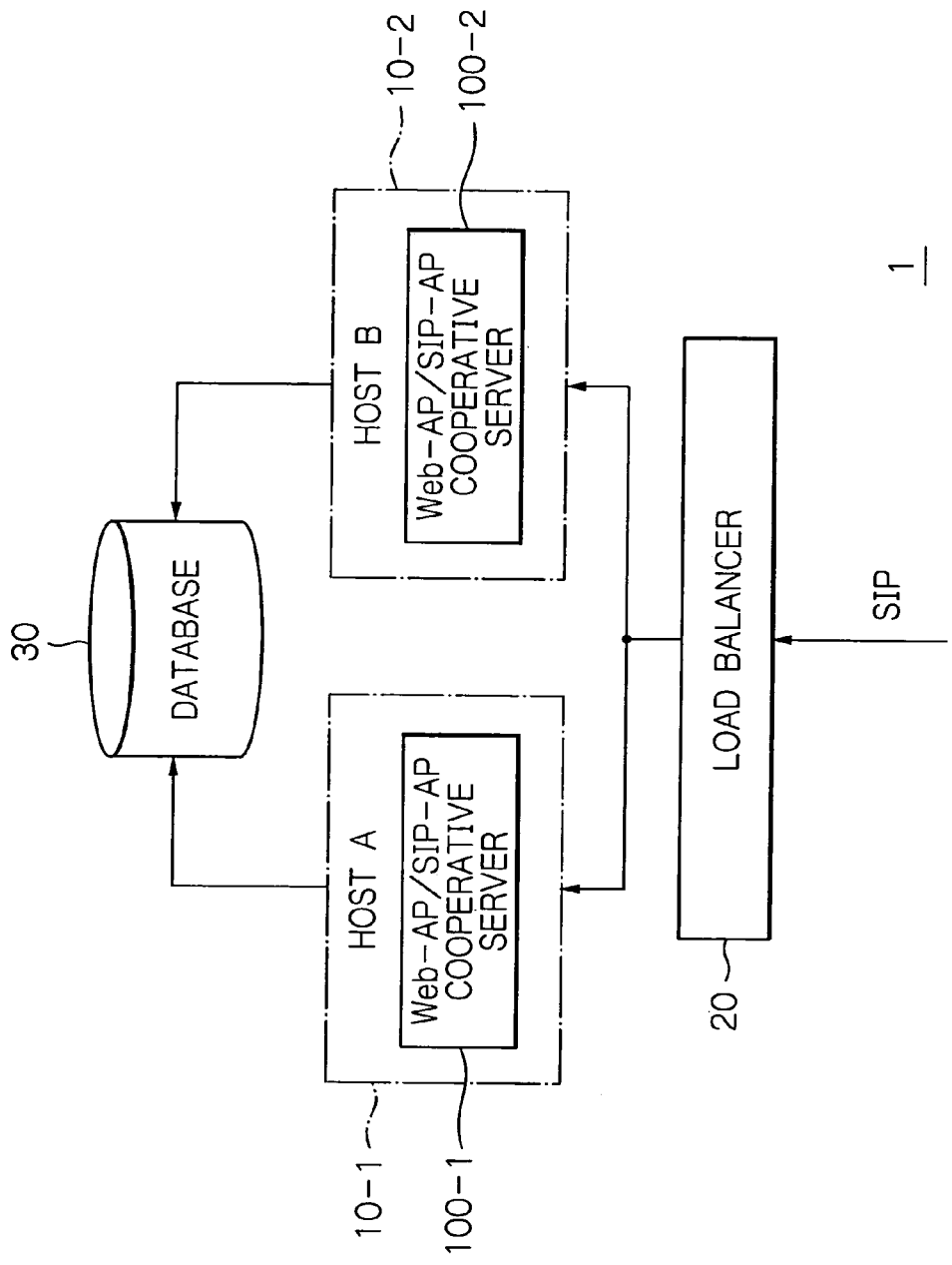
FIG. 3 is a schematic diagram showing the overall configuration of a communication system in the embodiment shown in FIG. 1.

FIG. 3 is a block diagram schematically showing the configuration of a communication system in the instant embodiment. As shown in FIG. 3, a communication system 1 in this embodiment comprises at least a host A 10-1, a host B 10-2, a load balancer 20, and a database 30 which are interconnected as illustrated.

The host A 10-1 has a Web-AP/SIP-AP cooperative server 100-1, and the host B 10-2 has a Web-AP/SIP-AP cooperative server 100-2. Although, in FIG. 3, the two hosts A 10-1 and host B 10-2 are shown, three or more hosts may be provided. The host A 10-1 may be a host computer or processor system in which the Web-AP/SIP-AP cooperative server 100-1 runs. The host B 10-2 is a host computer or processor system in which the Web-AP/SIP-AP cooperative server 100-2 runs. The host A 10-1 and host B 10-2 form a pair and configure a cluster.

The Web-AP/SIP-AP cooperative servers 100-1 and 100-2, which run in the host A 10-1 and the host B 10-2, provide services where two services are unified, that is, a service based on a predetermined Web application and a voice communication service based on SIP. Note that the Web-AP/SIP-AP cooperative servers 100-1 and 100-2 each have the corresponding functional configuration.

The load balancer 20, compatible with both the HTTP protocol and the SIP protocol, is a load balancer that distributes the load between the host A 10-1 and the host B 10-2. In response to an initial SIP request from the connected network, the load balancer 20 delivers the initial request to the host A 10-1 or the host B 10-2.

The database 30 has replication information on a SIP session stored therein. Both the host A 10-1 and host B 10-2 can access the database 30. In the illustrative embodiment, the dialog identification (ID) of a SIP session is associated with an HTTP session identification (ID), and an application session identification is associated with an HTTP session identification, those identifications being stored in the database 30. This configuration allows any of the hosts 10 to access the database and restore a SIP session.

Figure 1:
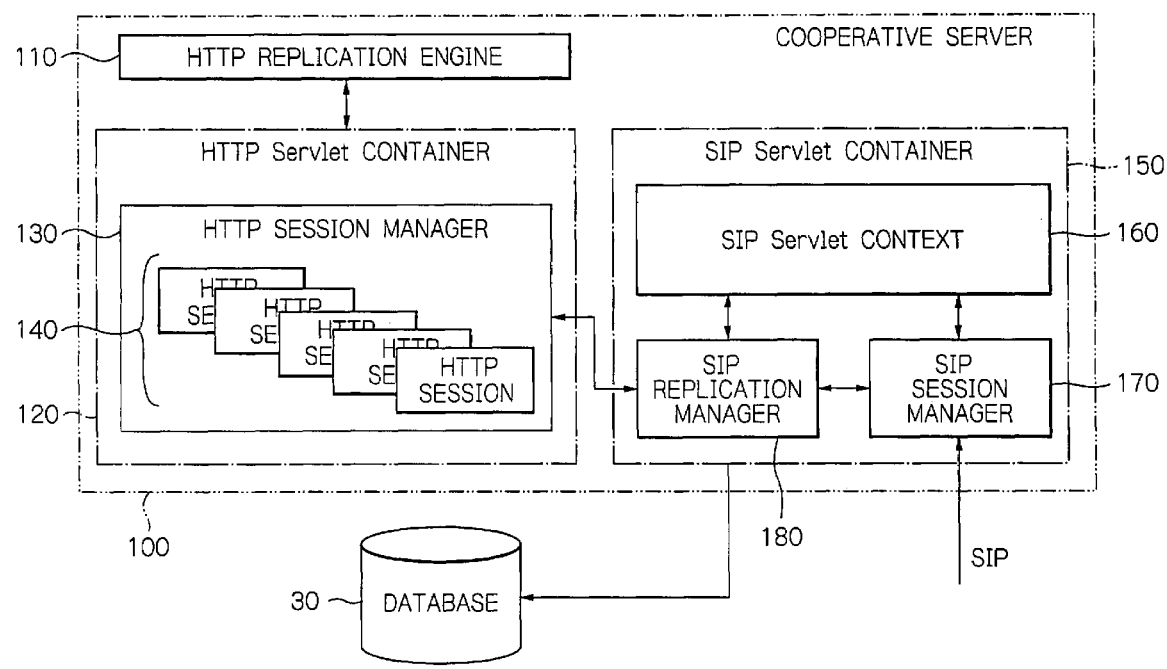
FIG. 1 is a schematic functional block diagram showing the internal function of a cooperative server in accordance with a preferred embodiment of the present invention.
Figure 2:
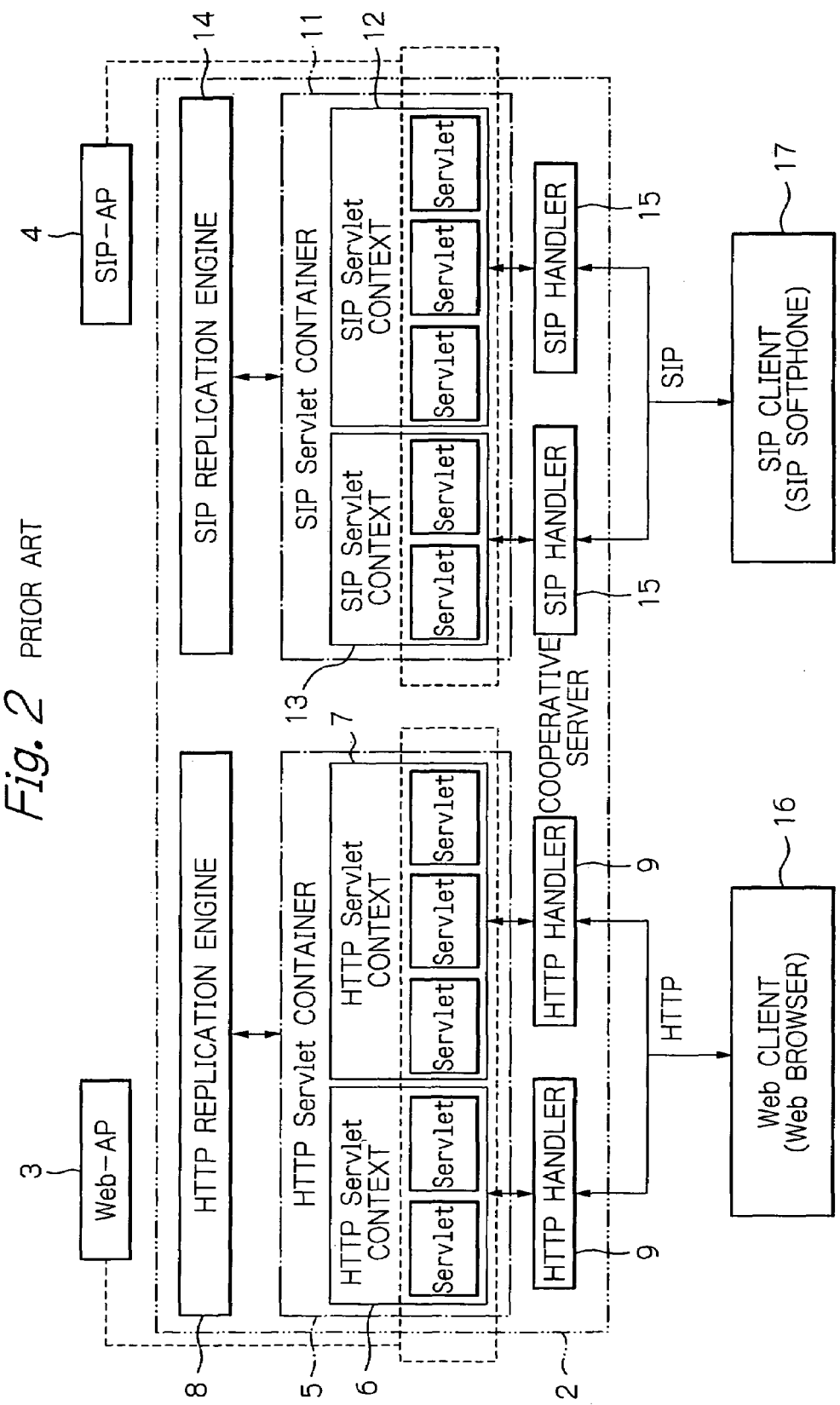
FIG. 2 is a functional block diagram schematically showing the internal function of a conventional cooperative server.

FIG. 1 is a schematic functional block diagram showing the internal function of a Web-AP/SIP-AP cooperative server 100, which may be servers 100-1 and 100-2, having the replication function. Specifically, referring to FIG. 1, the Web-AP/SIP-AP cooperative server 100 comprises an HTTP replication engine 110, an HTTP Servlet container 120, an HTTP session manager 130, HTTP sessions 140, a SIP Servlet container 150, a SIP Servlet context 160, a SIP session manager 170, and a SIP replication manager 180, which are interconnected as illustrated.

The HTTP replication engine 110, which works with the HTTP Servlet container 120, is a component that executes the replication function for generating the replica of a generated HTTP-session 140. Specifically, the HTTP replication engine 110 executes the generation processing of the replica of an HTTP session. Although the detailed operation will be described later, a SIP session is stored in the attribute information field of a HTTP session in the present embodiment. When generating the replica of an HTTP session, the HTTP replication engine 110 can also generate the replica of a SIP session by generating the replica of an HTTP session.

The HTTP Servlet container 120 is a component that manages an HTTP application or HTTP context. The HTTP Servlet container 120 generates an HTTP application corresponding to a received HTTP request and runs the generated HTTP application. The HTTP Servlet container also manages the deletion of an HTTP application.

The HTTP session manager 130 is a component that manages HTTP sessions 140. The HTTP session manager 130 provides the function to manage an HTTP session 140, for example, the HTTP session manager 130 generates and deletes an HTTP session 140.

The HTTP session 140 is a component that manages HTTP session information. The HTTP session 140 provides the function to process a sequence of HTTP requests as one meaningful unit.

The SIP Servlet container 150 is a component that manages a SIP application or SIP context. The SIP Servlet container 150 provides the management function for a SIP application, for example, the function to generate or delete a SIP application.

The SIP Servlet context 160 is a component that holds the internal state of an SIP application. The SIP Servlet context 160 can hold multiple SIP Servlets. A SIP Servlet is executed based on the internal state held in the SIP Servlet context 160.

The SIP session manager 170 is a component that manages sessions of the SIP protocol, such as SIP session and SIP application session. The SIP session manager 170 generates or deletes a SIP session for SIP Servlet context 160 based on a received SIP session. In addition, the SIP session manager 170 requests the SIP replication manager 180 to acquire, register, or delete a SP session or to acquire, register, or delete a SIP application session.

The SIP replication manager 180 is a component that manages the replica of a SIP session. In response to a request from the SIP session manager 170, the SIP replication manager 180 acquires, registers, or deletes a SIP session or acquires, registers, or deletes a SIP application session.

Figure 4:
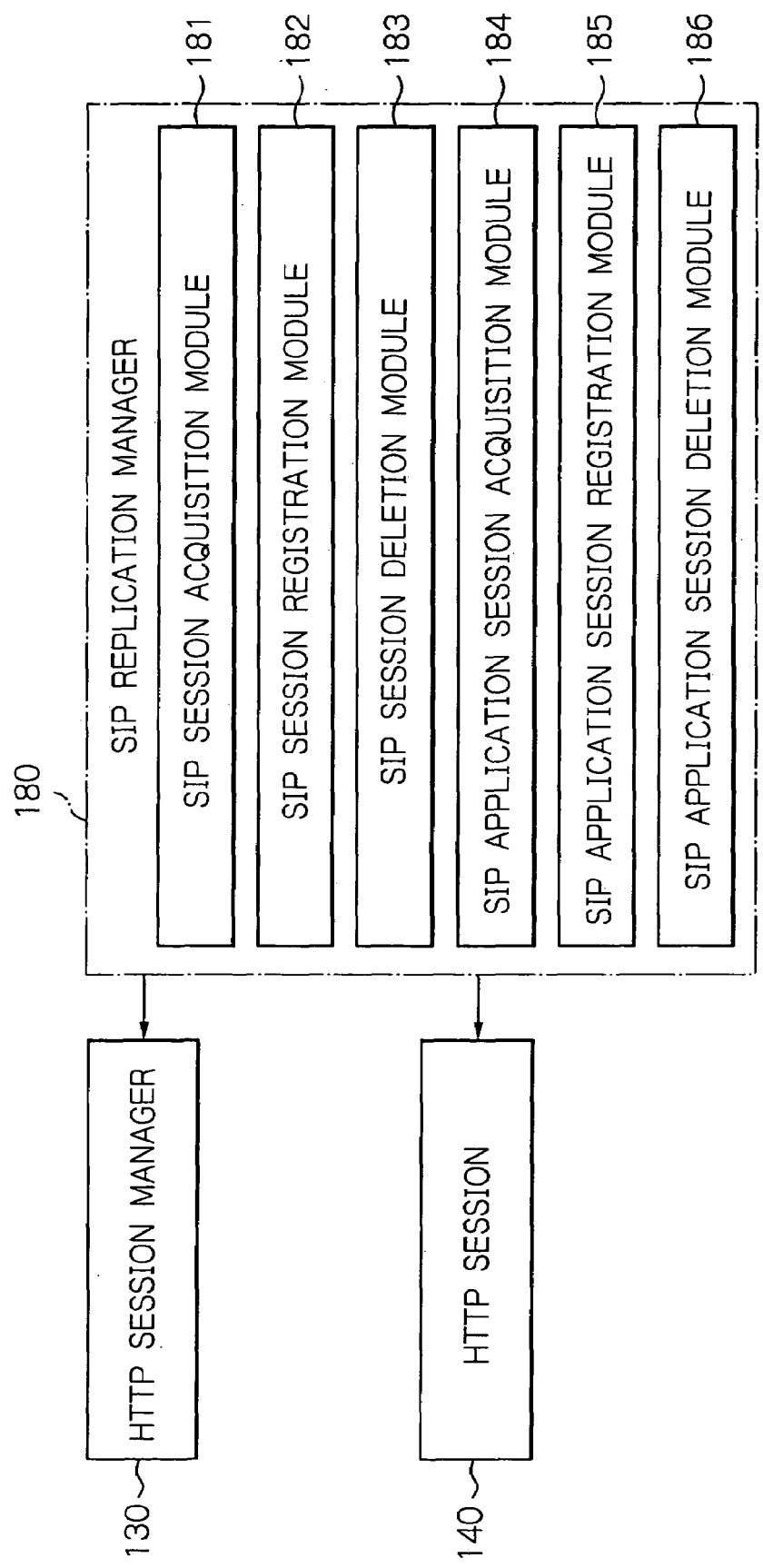
FIG. 4 is a schematic functional block diagram showing the function of a SIP replication manager in the embodiment.

Next, the following describes the function of the SIP replication manager 180. Now, reference will be made to FIG. 4, which schematically shows the functional configuration of the SIP replication manager 180 and the relation among the SIP replication manager 180, the HTTP session manager 130, and the HTTP session 140. In FIG. 4, the SIP replication manager 180 in the instant embodiment comprises at least a SIP session acquisition module 181, a SIP session registration module 182, a SIP session deletion module 183, a SIP application session acquisition module 184, a SIP application session registration module 185, and a SIP application session deletion module 186.

The SIP session acquisition module 181 is a module that receives a dialog ID (ID identifying a dialog), included in a SIP session, and acquires the replica of the SIP session.

The SIP session registration module 182 is a module that receives a SIP session and registers the SIP session to generate its replica.

The SIP session deletion module 183 is a module that receives a dialog identification and deletes the replica of the SIP session.

The SIP application session acquisition module 184 is a module that receives an application session identification and acquires the replica of the SIP application session.

The SIP application session registration module 185 is a module that receives a SIP application session and registers the SIP application session to generate its replica.

The SIP application session deletion module 186 is a module that receives an application session identification and deletes the replica of the SIP application session.

The operation of the server according to the present invention will be described below with reference to additional figures. The following first describes the SIP session registration operation that is divided into the four: operation executed when a SIP initial request is received, operation executed when a SIP response to a SIP initial request is received, operation executed when a subsequent SIP request is received, and operation executed when a SIP response to a subsequent SIP request is received. After having described those SIP session registration operations, a further description will be made on the operation to delete a SIP application session, the operation to delete a SIP session, and the operation to acquire a SIP session after a failover.

Figures 5, 6:
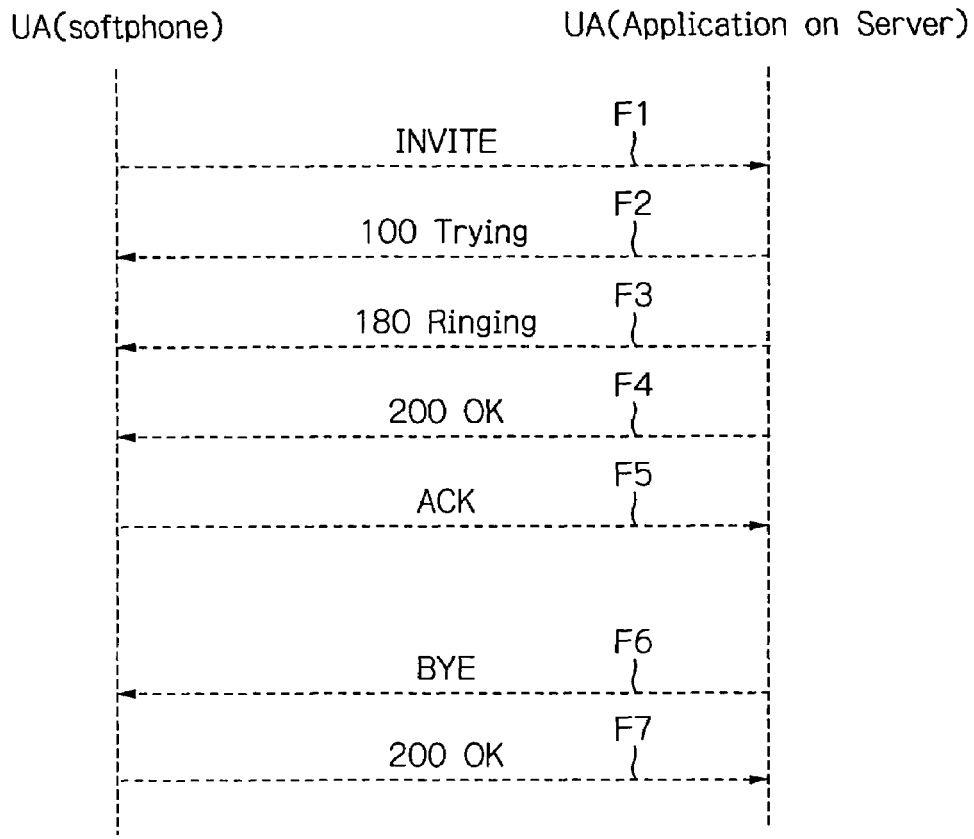
FIG. 5 schematically shows the sequence useful for understanding a SIP session in the embodiment.
FIGS. 6 and 7 show examples of messages for used in a SIP session in the embodiment.

Now, before describing those operations, a SIP session and a SIP application session in this embodiment will be described. A SIP session represents a dialog between two user agents (UAs) or a relation between two user agents before establishing a dialog. FIG. 5 schematically shows a call sequence between two user agents: a user agent of a softphone used by a user and a user agent on a server. A sequence of messages sent and received as shown in this figure is treated as one SIP session, i.e. dialog.

Figures 7, 8:
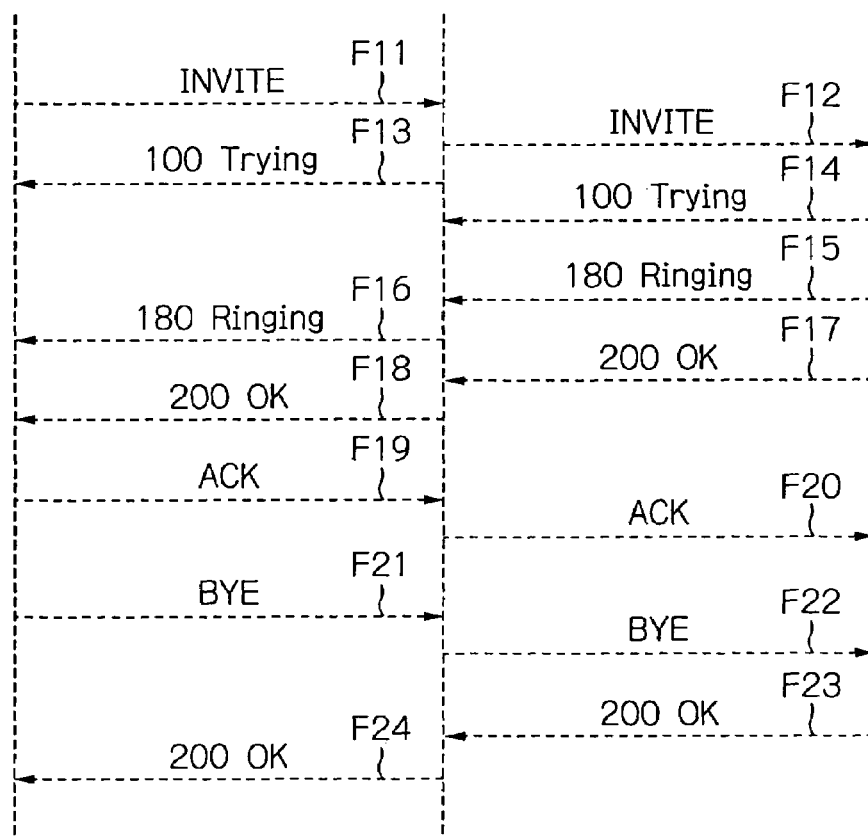
FIG. 8 schematically shows the sequence useful for understanding a SIP session in the embodiment.

For example, FIG. 6 shows an exemplified INVITE message sent by the user agent or softphone depicted with a dotted arrow F1 in FIG. 5. FIG. 7 shows an example of a 200 OK message sent by the user agent or softphone depicted with a dotted arrow F7 in FIG. 5. Those messages are processed in one SIP session.

A dialog, e.g. dialog identification (ID), can be identified uniquely by Call-ID, the tag parameter of From, and the tag parameter of To that are included in a SIP message.

For example, the dialog or dialog ID can be identified uniquely by "Call-ID: a84b4c76e66710@pc33.atlanta.com", "From tag: 1928301774", and "To tag: a6c85cf" in the 200 OK message in FIG. 7. The messages depicted with dotted arrows F3 through F7 have the same Call-ID, From tag, and To tag. Note that the initial request F1 and its 100 response F2 are exceptions and do not have the Call-ID and tags.

A SIP application session holds application data and associates among multiple SIP sessions. More precisely, not only a SIP session but also sessions based on another protocol such as HTTP session may also be associated. FIG. 8 shows a call connection sequence among two softphone user agents and the user agent on a server. The user agent on the server operates as a B2B UA (Back to Back User Agent). Only one SIP session is associated and held in FIG. 5, while two SIP sessions are associated and held in FIG. 8.

First, the following describes the operation of the SIP session registration operation. In this embodiment, a SIP session is registered when the SIP session is generated or updated. The replica of a SIP session is generated using the HTTP session replication function, provided by the Web-AP server, by storing the SIP session in the attribute of an HTTP session. More precisely, the SIP application session holding the SIP session is stored.

In this case, the SIP session, which is not usually a replicatable object, is converted to a replicatable object before being stored in the attribute of the HTTP session.

When the replica of the HTTP session is generated by the replication function provided by the Web-AP server, the replica of the SIP session is also generated automatically.

The information on the association between the dialog identification and the HTTP session identification and association between the application session identification and HTTP session identification, if stored in the database at the same time, allows any host to access the information. This association information allows any Web-AP/SIP-AP cooperative server, which can reference the database, to restore the SIP session at failover time.

The replication function can be executed during the registration operation of a SIP session at one of the following times in the sequence diagram in FIG. 8: that is, after a sequence F15, when 180 processing F15 is terminated; after a sequence F17, when 200 processing F17 is terminated; after a sequence F18, when 200 processing F18 (INVITE F11) is terminated; after a sequence F19, when ACK processing F19 is terminated; after a sequence F23, when 200 processing F23 is terminated; and after a sequence F24, when processing F24 (BYE F21) is terminated.

Figure 9:
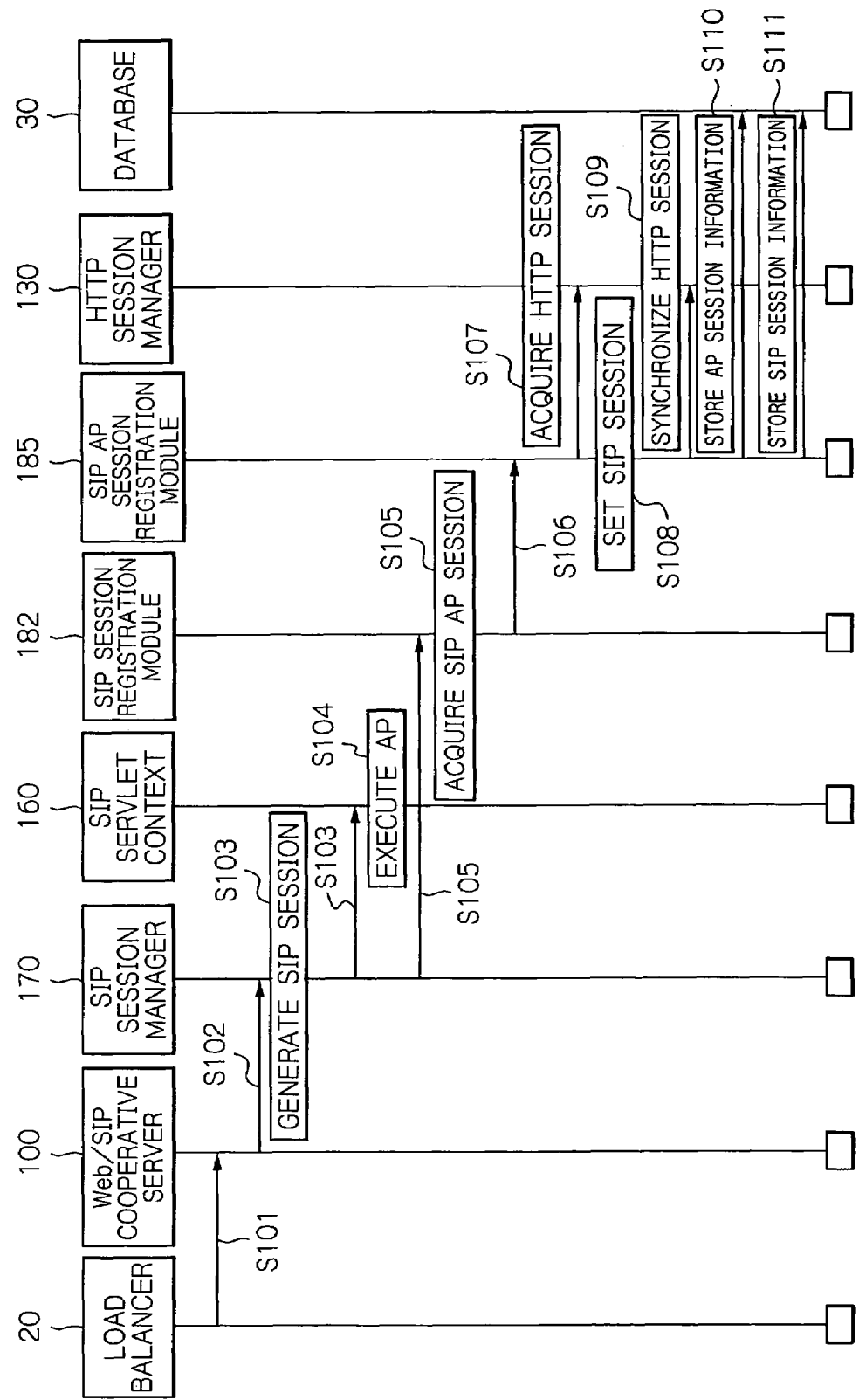
FIGS. 9, 10, 11 and 12 schematically show the sequences of the SIP session registration operation in the embodiment, when an initial request, a response to the initial request, a subsequent request and a response to the subsequent request are received, respectively.

Now, description will be made on registration operation executed when a SIP initial request is received. FIG. 9 is a sequence diagram schematically showing the registration operation of a SIP session when a SIP initial request is received. First, when the load balancer 20 receives a SIP initial request over the network, the load balancer 20 forwards the SIP initial request to the Web-AP/SIP-AP cooperative server 100-1 in the host A 10-1 (step S101). When the initial request is forwarded to the host B 10-2, the load balancer 20 also supplies the initial request to the host B 10-2 in the same way.

When the SIP initial request is received from the load balancer 20, it is forwarded to the SIP session manager 170 in the Web-AP/SIP-AP cooperative server 100-1 (S102).

In response to the SIP initial request, the SIP session manager 170 generates a SIP session (SIP session and SIP application session). After that, the SIP session manager 170 forwards the SIP request to the SIP Servlet context 160 (S103).

When the SIP request is received, the SIP Servlet context 160 forwards the SIP request to an appropriate SIP Servlet. The SIP Servlet performs processing for the SIP request (S104). The processing for SIP request is performed in this way.

On the other hand, the SIP session manager 170 that generated the SIP session in S103 as described above sends the generated SIP session to the SIP session registration module 182 in the SIP replication manager 180 (S105). This makes it possible for the SIP session of the initial request of the SIP to be registered.

When the SIP session is received from the SIP session manager 170, the SIP session registration module 182 acquires the SIP application session from the SIP session and sends the acquired SIP application session to the SIP application session registration module 185 (S106).

When the SIP application session is received from the SIP session registration module 182, the SIP application session registration module 185 acquires a new HTTP session from the HTTP session manager 130 (S107). In this case, if the HTTP session corresponding to the SIP application session already exists, the SIP application session registration module 185 acquires the existing HTTP session.

To acquire an HTTP session, the SIP application session acquisition module 184 searches the database 30 for the HTTP session identification with the SIP application ID or dialog ID of the SIP application session as the key.

Then, the SIP application session acquisition module 184 sends the HTTP session identification, which has been searched for, to the HTTP session manager 130 to acquire an HTTP session 140, corresponding to the HTTP session identification, from the HTTP session manager 130.

The SIP application session registration module 185 converts the SIP application session to a replicable object and sets it in the attribute of the acquired HTTP session (S108).

In this case, when the SIP application session is converted to a replicable object, all objects held by the SIP application session are also converted to replicable objects. For example, the SIP session, SIP request, and SIP response are converted to replicable objects.

After the SIP session is set in the attribute of the HTTP session, the SIP application session registration module 185 requests the HTTP session manager 130 to establish the synchronization of the HTTP session acquired in S107 (S109). Specifically, the HTTP replication engine 110 generates the replica of the HTTP session whose attribute information contains the SIP session.

The SIP application session registration module 185 stores the session identification of the SIP application session and the session identification of the HTTP session acquired in S107 into the database 30 with correspondence established between them (S110).

The SIP application session registration module 185 also stores the dialog identification of the SIP session and the session identification of the HTTP session, acquired in S107, into the database 30 with correspondence established between them (S111). In this case, if the SIP application session has multiple SIP sessions, the SIP application session registration module 185 performs this processing, once for each SIP session.

Now, registration operation will be described to be executed when a SIP response to a SIP initial request is received.

Figure 10:
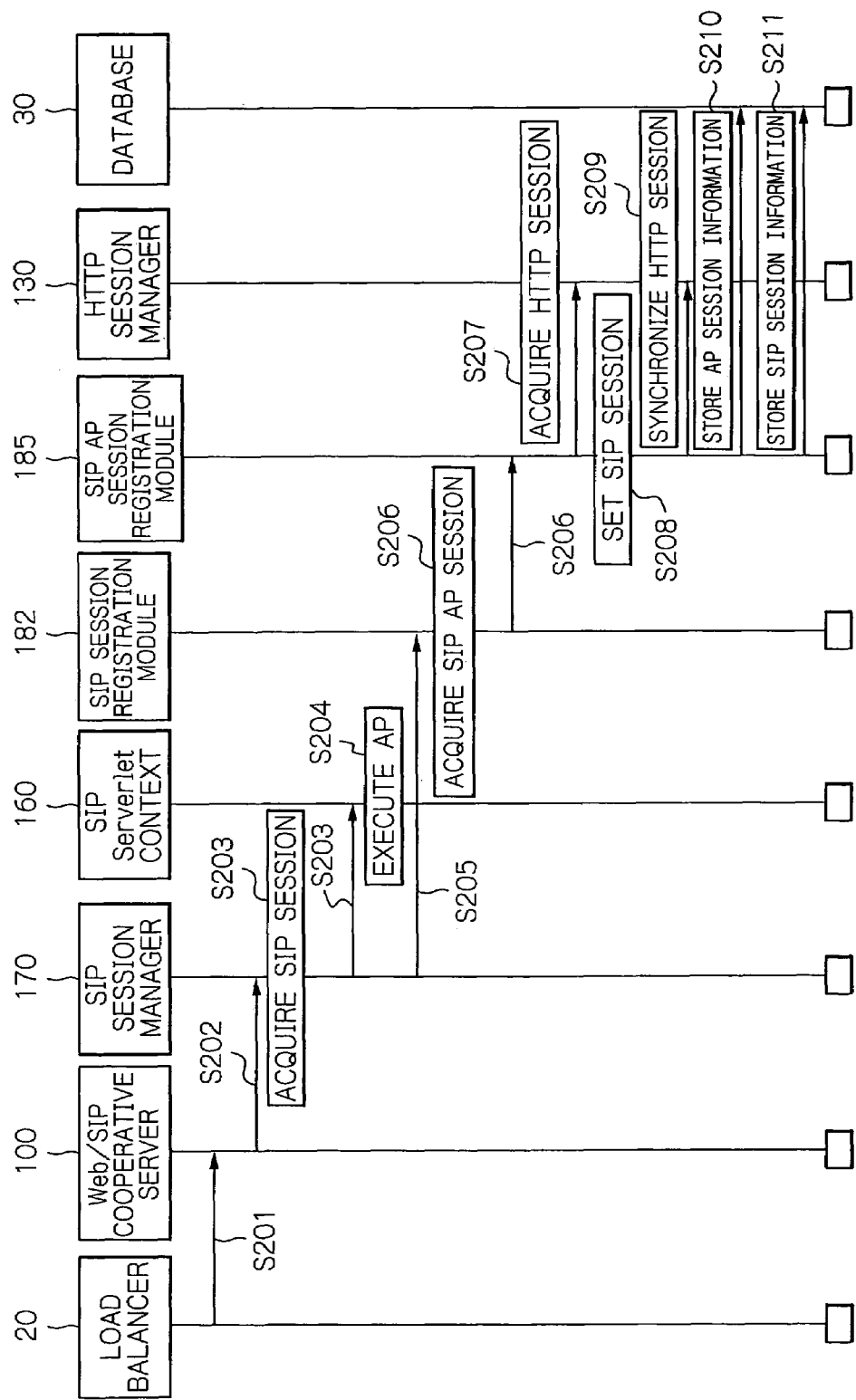

FIG. 10 is a sequence diagram schematically showing the registration operation executed when a SIP response to a SIP initial request is received. First, when the load balancer 20 receives a SIP response, the load balancer 20 forwards the SIP response to the Web-AP/SIP-AP cooperative server 100-1 in the host A 10-1 (S201). When the response is forwarded to the host B 10-2, the load balancer 20 supplies the response to the host B 10-2 in the same way.

When the SIP response is received from the load balancer 20, it is forwarded to the SIP session manager 170 in the Web-AP/SIP-AP cooperative server 100-1 (S202).

In response to the SIP response, the SIP session manager 170 acquires the SIP session corresponding to the SIP response. Note that the SIP session that is acquired is the one generated when the SIP request corresponding to the SIP response was sent. Thereafter, the SIP session manager 170 forwards the SIP response to the SIP Servlet context 160 (S203).

The SIP Servlet context 160 forwards the SIP response to an appropriate SIP Servlet. The SIP Servlet processes the response (S204).

On the other hand, the SIP session manager 170 sends the SIP session, acquired in S203, to the SIP session registration module 182 in the SIP replication manager 180 (S205).

When the SIP session is received from the SIP session manager 170, the SIP session registration module 182 acquires the SIP application session from the SIP session and sends the SIP application session to the SIP application session registration module 185 (S206).

When the SIP application session is received, the SIP application session registration module 185 acquires a new HTTP session from the HTTP session manager 130 (S207). In this case, if the HTTP session corresponding to the SIP application session already exists, the SIP application session registration module 185 acquires the existing HTTP session.

The SIP application session registration module 185 converts the SIP application session to a replicable object and sets it in the attribute of the acquired HTTP session (S208).

In this case, when the SIP application session is converted to a replicable object, all objects held by the SIP application session are also converted to replicable objects.

The SIP application session registration module 185 requests the HTTP session manager 130 to establish the synchronization of the HTTP session acquired in S207 (S209).

The SIP application session registration module 185 stores the session identification of the SIP application session and the session identification of the HTTP session acquired in S207 into the database 30 with correspondence established between them (S210).

The SIP application session registration module 185 also stores the dialog identification of the SIP session and the session identification of the HTTP session, acquired in S207, into the database 30 with correspondence established between them (S211).

In this case, if the SIP application session has multiple SIP sessions, the SIP application session registration module 185 performs this processing, once for each SIP session.

Figure 11:
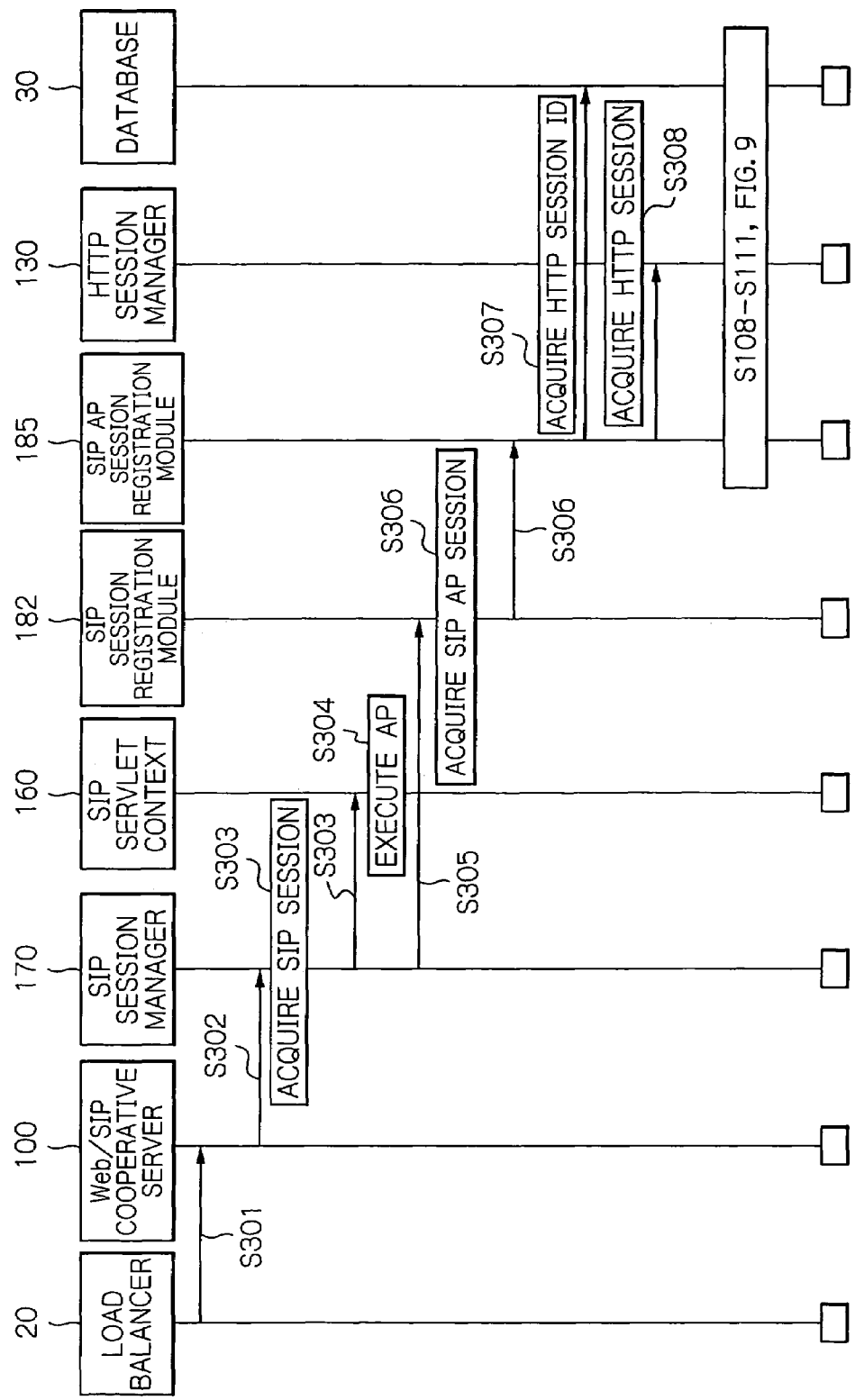

Further, registration operation will be executed when a subsequent SIP request is received. FIG. 11 is a sequence diagram schematically showing the registration operation executed when a subsequent SIP request is received. First, when the load balancer 20 receives a subsequent SIP request, the load balancer 20 forwards the request to the Web-AP/SIP-AP cooperative server 100-1 in the host A 10-1 (S301). When the response is forwarded to the host B 10-2, the load balancer 20 supplies the response to the host B 10-2 in the same way.

When the subsequent SIP request is received from the load balancer 20, it is forwarded to the SIP session manager 170 in the Web-AP/SIP-AP cooperative server 100-1 (S302).

The SIP session manager 170 acquires the SIP session and forwards the SIP request to the SIP Servlet context 160 (S303). Note that the SIP session is already generated at this time.

The SIP Servlet context 160 forwards the SIP request to an appropriate SIP Servlet. The SIP Servlet processes the request (S304).

On the other hand, the SIP session manager 170 sends the SIP session, acquired in S303, to the SIP session registration module 182 in the SIP replication manager 180 (S305).

The SIP session registration module 182 acquires the SIP application session from the SIP session and sends the SIP application session to the SIP application session registration module 185 (S306).

The SIP application-session registration module 185 acquires the HTTP session from the HTTP session manager 130 (S307).

To acquire the HTTP session, the SIP application session registration module 185 searches the database 30 for an HTTP session identification with the SIP application session identification as the key. When the HTTP session identification is found, the SIP application session registration module 185 can acquire the HTTP session based on the HTTP session identification (S307).

The processing in the step S308 and the subsequent steps is the same as that in the steps S108-S111 in FIG. 9 and, therefore, the detailed description will not be repeated.

Figure 12:
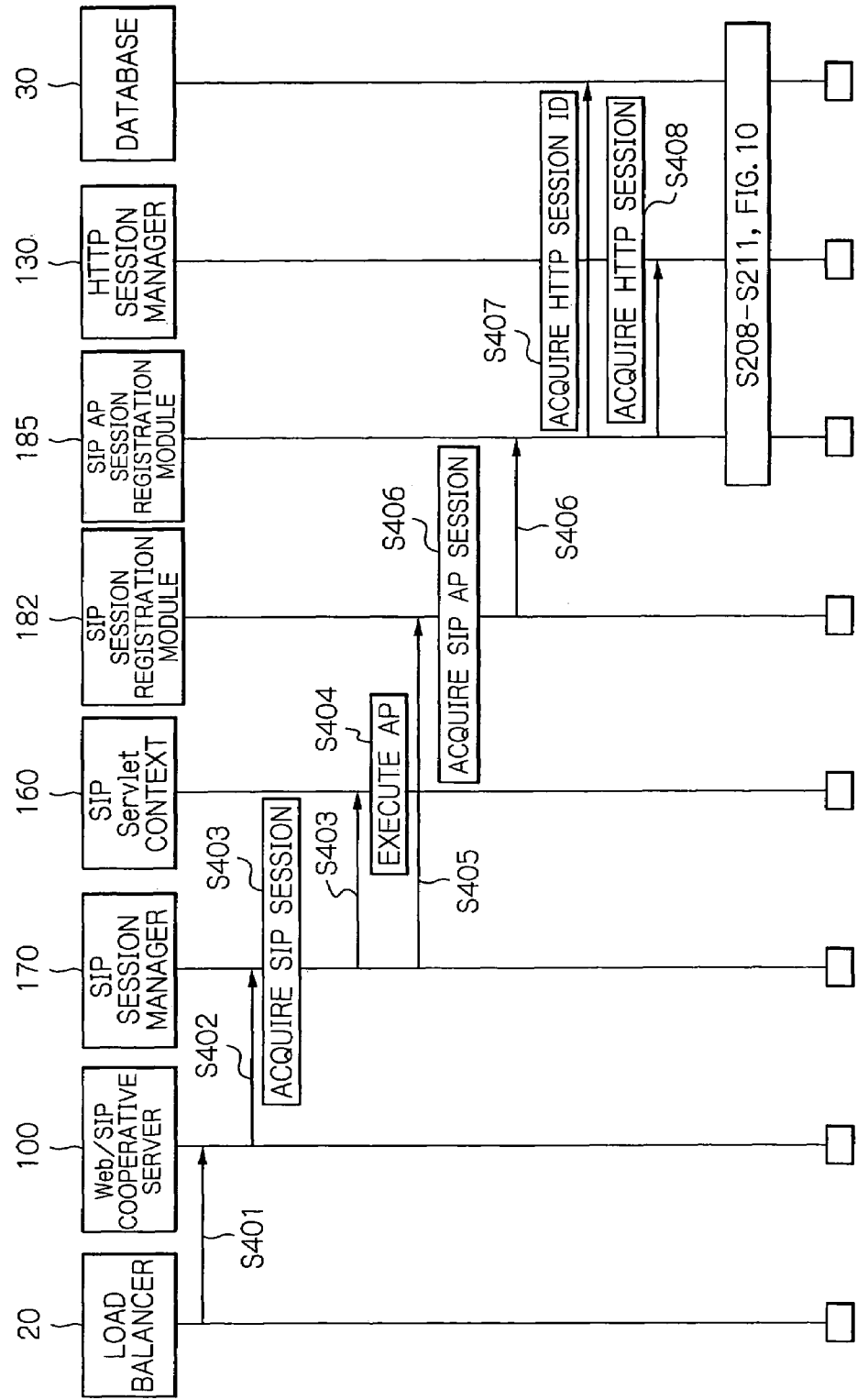

Well, description will be made on registration operation executed when a SIP response to a subsequent SIP request is received. FIG. 12 is a sequence diagram schematically showing the registration operation executed when a SIP response to a subsequent SIP request is received. First, when the load balancer 20 receives a subsequent SIP response, the load balancer 20 forwards the response to the Web-AP/SIP-AP cooperative server 100-1 in the host A 10-1 (S401). When the response is forwarded to the host B 10-2, the load balancer 20 supplies the response to the host B 10-2 in the same way.

When the SIP-response is received from the load balancer 20, it is forwarded to the SIP session manager 170 in the Web-AP/SIP-AP cooperative server 100-1 (S402).

The SIP session manager 170 acquires the SIP session corresponding to the SIP response and forwards the SIP response to the SIP Servlet context 160 (S403). Note that the SIP session is already generated when the SIP request corresponding to the SIP response was sent.

The SIP Servlet context 160 forwards the SIP response to an appropriate SIP Servlet. The SIP Servlet processes the response (S404).

The SIP session manager 170 sends the SIP session, acquired in S403, to the SIP session registration module 182 in the SIP replication manager 180 (S405).

The SIP session registration module 182 acquires the SIP application session from the SIP session and sends the SIP application session to the SIP application session registration module 185 (S406).

The SIP application session registration module 185 acquires the HTTP session from the HTTP session manager 130 (S407). To acquire the HTTP session, the SIP application session registration module 185 searches the database 30 for an HTTP session identification with the SIP application session identification as the key. When the HTTP session identification is found, the SIP application session registration module 185 can acquire the HTTP session based on the HTTP session identification (S408).

The processing in the step S408 and the subsequent steps is the same as that in the steps S208-S211 in FIG. 10 and, therefore, the detailed description will not be repeated.

Figure 13:
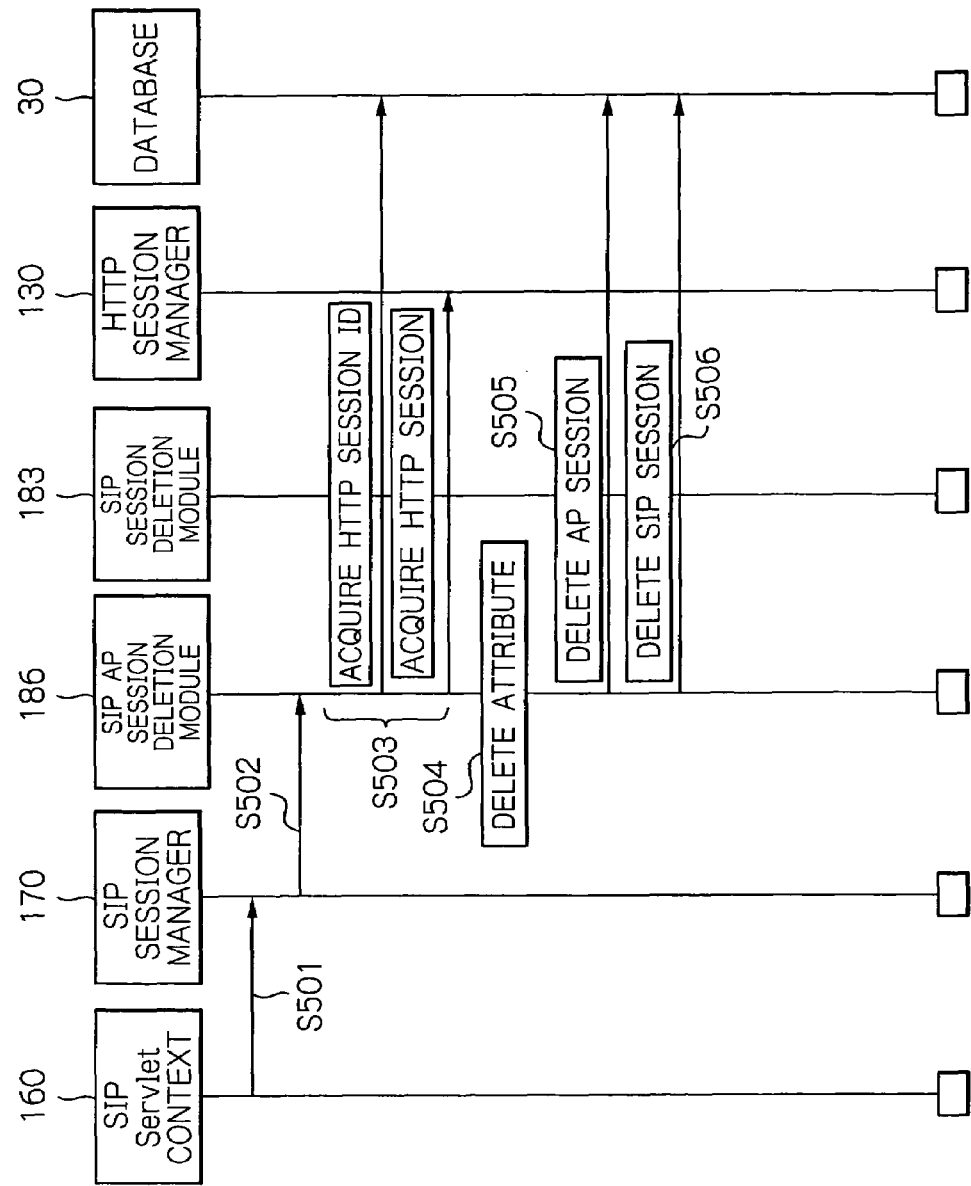
FIGS. 13 and 14 schematically show the sequence of the SIP application session deletion operation and the SIP session deletion operation in the embodiment, respectively.

Next, the following describes the SIP application session deletion operation with reference to FIG. 13. First, the operation to delete a SIP application session will be executed when a SIP application terminates processing and discards the SIP application session.

At this time, the association between the SIP application session identification and the HTTP session identification and the association between the dialog identification and the HTTP session identification, which are stored in the database, are deleted.

During the deletion of a SIP application session, the replication function is executed when F24 in FIG. 8 is terminated and it is determined that the application does not execute processing any more.

When a SIP application session is deleted, the SIP Servlet context 160 requests the SIP session manager 170 to discard the SIP application session (S501).

The SIP session manager 170 requests the SIP application session deletion module 186 of the SIP replication manager 180 to delete the SIP application session (S502).

The SIP application session deletion module 186 acquires the HTTP session 140, corresponding to the SIP application session, from the HTTP session manager 130 (S503).

To do so, the SIP application session deletion module 186 acquires the HTTP session identification from the database 30 based on the session identification of the SIP application session and sends the acquired HTTP session identification to the HTTP session manager 130 to acquire the HTTP session 140 with the HTTP session identification as the key.

When the HTTP session 140 is acquired from the HTTP session manager 130, the SIP application session deletion module 186 deletes the attribute that is set in the acquired HTTP session 140 (S504).

The SIP application session deletion module 186 also deletes the association between the SIP application session identification and the HTTP session identification from the database 30 (S505).

In addition, the SIP application session deletion module 186 deletes the association between the dialog identification and the HTTP session identification from the database 30 (S506).

The processing in the steps S505 and S506 is performed, once for each SIP session held by the SIP application session identification.

Figure 14:
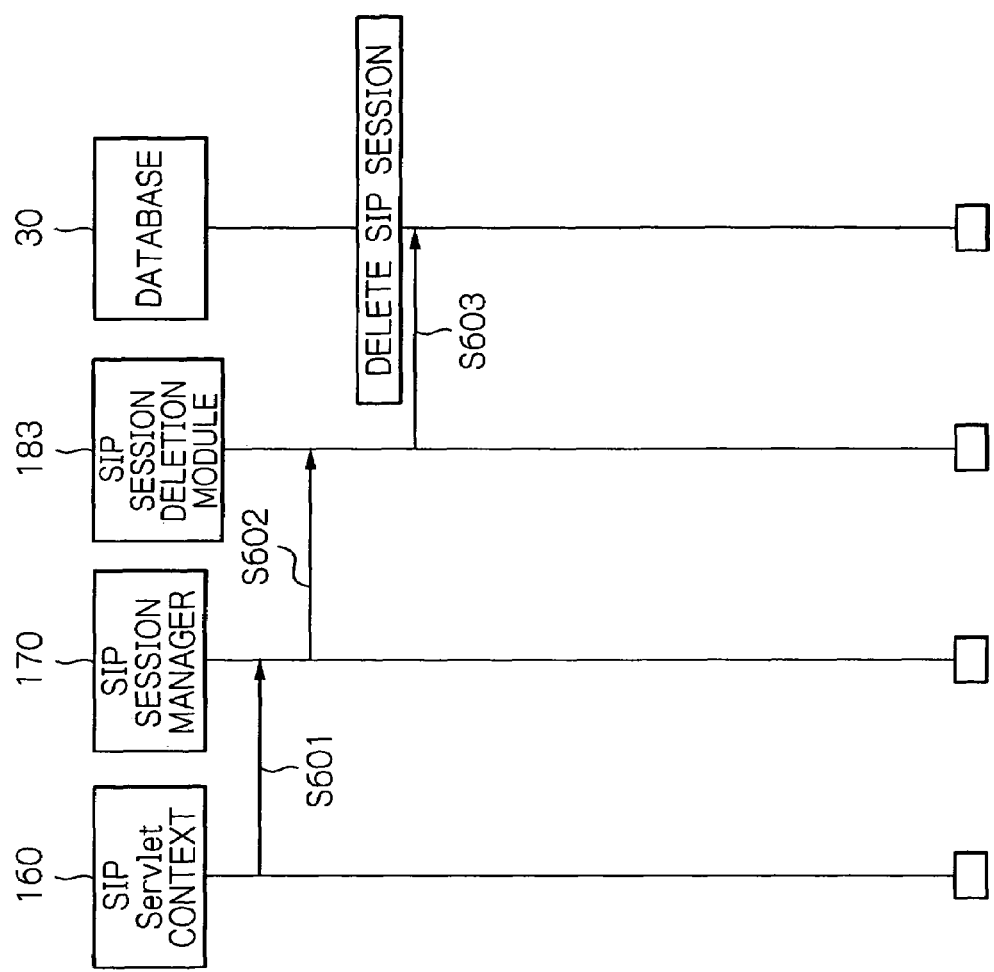

Next, the following describes the SIP session deletion operation with reference to FIG. 14. The SIP session deletion operation is executed when the processing of a sequence of messages (SIP session processing) is finished and the SIP session is discarded. At this time, the association between the dialog identification and the HTTP session identification stored in the database is deleted.

During the SIP session deletion operation, the replication function is executed when F24 in FIG. 8 is terminated and it is determined that the application does not execute processing any more.

When deleting a SIP session, the SIP Servlet context 160 requests the SIP session manager 170 to discard the SIP application session (S601).

The SIP session manager 170 requests the SIP session deletion module 183 of the SIP replication manager 180 to delete the SIP session (S602).

The SIP session deletion module 183 deletes the association between the dialog identification and the HTTP session identification from the database 30 (S603).

Next, with reference to FIG. 15, the operation will be described to acquire a SIP session after a failover occurs. The SIP session acquisition operation, executed after a failover occurs, is executed in the following case. For example, when a failure occurs in the Web-AP/SIP-AP cooperative server 100-2 of the host B 10-2, it is required to continue the processing of a SIP session, which has been processed in the Web-AP/SIP-AP cooperative server 100-2, in the Web-AP/SIP-AP cooperative server 100-1 of the host A 10-1. In such a case, the replica of the SIP session is used to restore the SIP session.

To restore a SIP session, the dialog identification is first acquired from a SIP request when the SIP request is received. Next, the HTTP session identification is acquired with the dialog identification as the key, and the SIP session is restored from the SIP application session stored in the corresponding HTTP session. The received SIP request can be processed by the restored SIP session.

If an application server fails, for example, when the processing in F20 in FIG. 8 is terminated, the replication function is executed during the operation at failover time when another application server receives the request in F21 during the failover.

Figure 15:
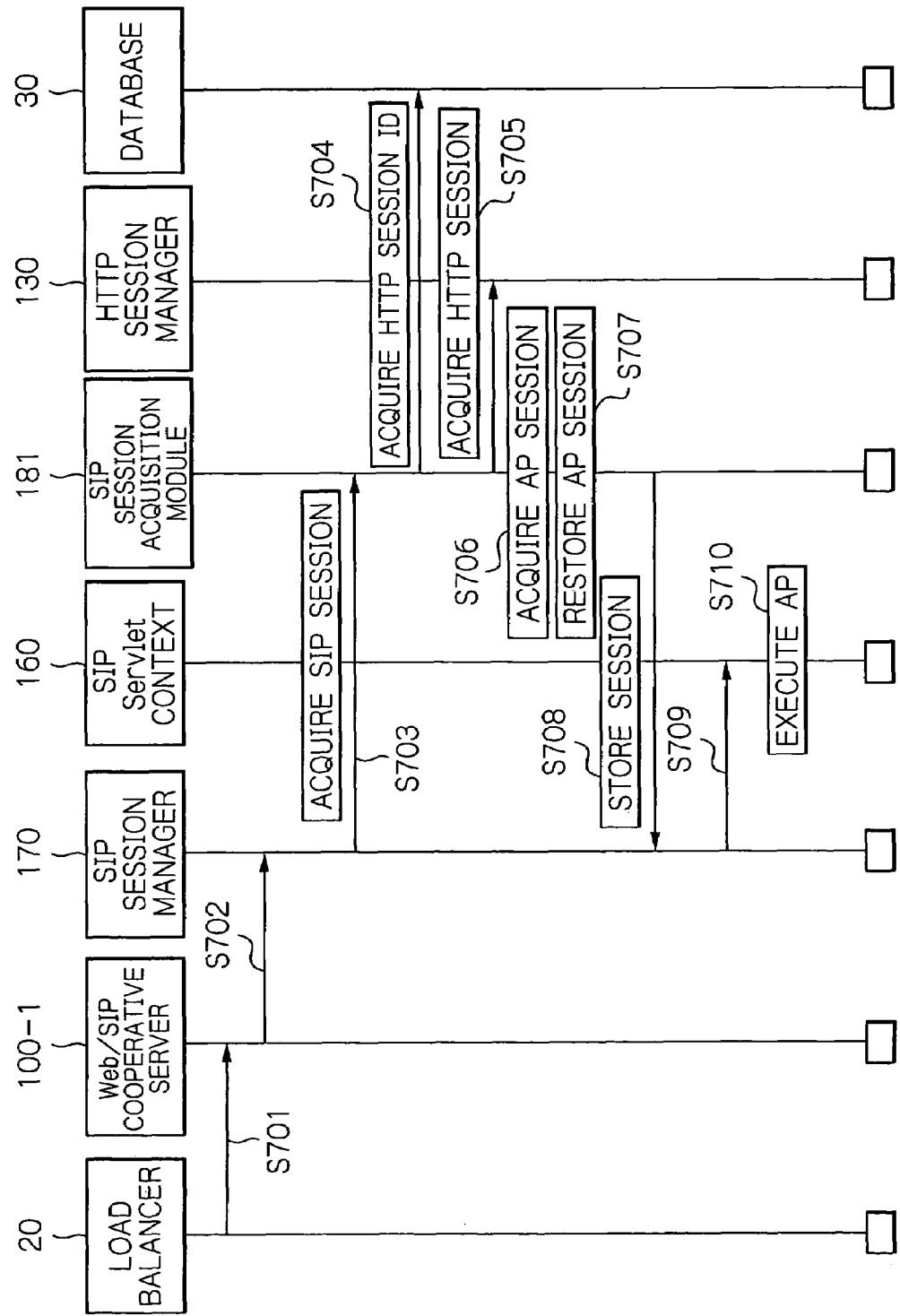
FIG. 15 schematically shows the sequence of the SIP session acquisition operation when a failover occurs in the embodiment.

The following describes the SIP session acquisition operation at failover time in detail with reference to FIG. 15. In the description below, assume that a failure occurs in the host B 10-2 and that host A 10-1 restores the SIP session.

If the load balancer 20 receives a SIP request after a failure occurs in the host B 10-2, the load balancer 20 forwards the SIP request to the Web-AP/SIP-AP cooperative server 100-1 of the host A 10-1 (S701).

When the SIP request is received from the load balancer 20, it is forwarded to the SIP session manager 170 in the Web-AP/SIP-AP cooperative server 100-1 (S702).

In response to the SIP request, the SIP session manager 170 searches for the SIP session. However, the SIP session manager 170 cannot search for the SIP session but requests the SIP session acquisition module 181 of the SIP replication manager 180 to acquire the SIP session (S703).

In response to the request from the SIP session manager 170, the SIP session acquisition module 181 searches the database 30 for the HTTP session identification with the dialog identification of the SIP session as the key (S704).

When the HTTP session identification is acquired from the database 30, the SIP session acquisition module 181 acquires the corresponding HTTP session 140 from the HTTP session manager 130 based on the acquired HTTP session identification (S705).

When the HTTP session 140 is acquired, the SIP session acquisition module 181 acquires the SIP application session that is stored in the attribute of the HTTP session 140 in the replicable object form (S706).

The SIP session acquisition module 181 converts the acquired object into the original SIP application session for restoring the SIP application session (S707). In this case, all replicable objects are converted to the original objects.

When the SIP application session is restored, the SIP session acquisition module 181 stores the SIP application session, as well as the SIP session held by the SIP application session, into the SIP session manager 170 (S708).

When the SIP application session and the SIP session are received, the SIP session manager 170 forwards the SIP request to the SIP Servlet context 160 (S709).

The SIP Servlet context 160 forwards the SIP request to an appropriate SIP Servlet. The SIP Servlet processes the request (S710).

In the illustrative embodiment, the SIP replication manager, provided in place of the conventional SIP replication engine as described above, uses the replication engine of the Web-AP server to execute the SIP replication function. This configuration eliminates the need for the SIP-AP server function to have the SIP replication function.

In this embodiment described above, using an HTTP session to generate the replica of a SIP session allows the Web-AP server to simply control SIP replication function.

Although an HTTP session is used to replicate a SIP session in the example shown and described in connection with the embodiment, the method according to the present invention can be applied to the replication of not only a SIP session but also a SIP transaction.

The entire disclosure of Japanese patent application No. 2005-175188 filed on Jun. 15, 2005, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communications system comprising a first and a second server and a storage, said first server comprising:

a first processor for executing a processing in connection with a first HTTP (HyperText Transfer Protocol) associated with a signal received by said first server in connection with the first HTTP;

a second processor for executing a processing in connection with a first SIP (Session Initiation Protocol) associated with a signal received by said first server in connection with the first SIP;

a first memory for storing the processing in connection with the first SIP;

a first acquirer for acquiring a processing in connection with a second HTTP from the processing in connection with the first SIP; and a second memory for storing a first replica of the processing in connection with the first HTTP and first identification information of the processing in connection with the first HTTP to be associated with each other, said second memory storing a second replica of the processing in connection with the second HTTP and second identification information of the processing in connection with the second HTTP to be associated with each other, the second replica to be a replica of the processing in connection with the first SIP, said first server further comprising a first transmitter for transmitting third identification information of the processing in connection with the first SIP and the second identification information to said storage, said storage comprising a third memory having an access to information stored in said third memory from said first and second servers for storing the third identification information and the second identification information to be associated with each other, said second server comprising a fourth memory for storing the second replica and the second identification information in synchronous with said second memory, said first server further comprising a first synchronizer for synchronizing said second memory with said fourth memory to store the second replica and the second identification information into said fourth memory; and said second server further comprising a second acquirer operative in response to said second server having received the signal in connection with the first SIP for acquiring from said third memory the second identification information associated with the third identification information, said second acquirer acquiring from said fourth memory the second replica associated with the second identification information to restore the processing in connection with the first SIP from the second replica, said second server further comprising a third processor operative in response to the processing restored by said second acquirer for executing the processing of the signal received by said second server in connection with the first SIP.

2. The system in accordance with claim 1, further comprising a transfer system which comprises:

a protocol processor for processing the signal in connection with the first HTTP and the signal in connection with the first SIP;

a load balancer for receiving the signal in connection with the first SIP to transmit the signal in connection with the first SIP to said first server so as to distribute load between said first and second servers; and a failure processor for receiving the signal in connection with the first SIP when a failure occurs in said first server to transmit the signal in connection with the first SIP to said second server.

3. The system in accordance with claim 1, wherein the processing in connection with the first SIP is an SIP session or an SIP transaction.

4. The system in accordance with claim 1, wherein the second replica stored in said fourth memory is a replicable object converted from the processing in connection with the first SIP set in an attribute of the processing in connection with the second HTTP.

5. A communications method in a communications system comprising a first and a second server and a storage, the first server comprising:

a first processor for executing a processing in connection with a first HTTP (HyperText Transfer Protocol) associated with a signal received by the first server in connection with the first HTTP;

a second processor for executing a processing in connection with a first SIP (Session Initiation Protocol) associated with a signal received by the first server in connection with the first SIP;

a first memory for storing a first replica of the processing in connection with the first HTTP and first identification information of the processing in connection with the first HTTP to be associated with each other; and the storage comprising a second memory having an access to information stored in the third memory from the first and second servers, the second server comprising a third memory for storing a replica and identification information stored in the first memory in synchronous with each other to be associated with each other, said method comprising in the first server:

a first memory step of storing the processing in connection with the first SIP;

a first acquiring step of acquiring a processing in connection with a second HTTP from the processing in connection with the first SIP;

a second memory step of storing a second replica of the processing in connection with the second HTTP and second identification information of the processing in connection with the second HTTP to be associated with each other, the second replica to be a replica of the processing in connection with the first SIP; and a synchronizing step of synchronizing the first memory with the third memory to store the second replica and the second identification information into the third memory; and a transmitting step of transmitting third identification information of the processing in connection with the first SIP and the second identification information to the storage, said method further comprising in the second memory a third memory step of storing the third identification information and the second identification information to be associated with each other, said method further comprising in the second server:

a second acquiring step of acquiring from the second memory, when the second server has received the signal in connection with the first SIP, the second identification information associated with the third identification information, and acquiring from the third memory the second replica associated with the second identification information to restore the processing in connection with the first SIP from the second replica; and a processing step of using the processing restored in said acquiring step to execute the processing of the signal received by the second server in connection with the first SIP.

6. The method in accordance with claim 5, wherein the communications system further comprises a transfer system, said method further comprising in the transfer system:

a protocol processing step of processing the signal in connection with the first HTTP and the signal in connection with the first SIP;

a load balancing step of receiving the signal in connection with the first SIP to transmit the signal in connection with the first SIP to the first server so as to distribute load between the first and second servers; and a failure processing step of receiving the signal in connection with the first SIP when a failure occurs in the first server to transmit the signal in connection with the first SIP to the second server.

7. The method in accordance with claim 5, wherein the processing in connection with the first SIP is an SIP session or an SIP transaction.

8. The method in accordance with claim 5, wherein the second replica stored in the third memory is a replicable object converted from the processing in connection with the first SIP set in an attribute of the processing in connection with the second HTP.

* * * * *